United States Patent [19]
Greenberg

[11] Patent Number: 5,598,461
[45] Date of Patent: Jan. 28, 1997

[54] PERSONALIZED ANNUNCIATION SIGNALING PHONE UNIT

[76] Inventor: Stephen Greenberg, c/o R. Greenberg, Apt. #405, 555 Jervis St., Vancouver, B.C., Canada, V6E 4N1

[21] Appl. No.: 250,867

[22] Filed: May 26, 1994

[51] Int. Cl.⁶ .............................. H04M 1/64; H04M 1/00
[52] U.S. Cl. ........................ 379/67; 379/373; 379/374
[58] Field of Search ........................... 379/67, 88, 70, 379/372, 373, 374, 375, 217

[56] References Cited

U.S. PATENT DOCUMENTS

| | | |
|---|---|---|
| 3,506,791 | 4/1970 | Halaby . |
| 3,936,617 | 2/1976 | Bolgiano .................... 379/373 |
| 3,943,289 | 3/1976 | Sheldon et al. .............. 379/69 |
| 4,006,316 | 2/1977 | Bolgiano . |
| 4,850,012 | 7/1989 | Mehta et al. ............... 379/374 |
| 4,850,013 | 7/1989 | Rose .......................... 379/373 |
| 4,866,766 | 9/1989 | Mitzlaff ...................... 379/373 |
| 4,982,420 | 1/1991 | Theis .......................... 379/68 |
| 4,998,272 | 3/1991 | Hawkins, Jr. et al. ...... 379/69 |
| 5,031,205 | 7/1991 | Phillips ...................... 379/373 |
| 5,172,404 | 12/1992 | Hashimoto .................. 379/69 |

FOREIGN PATENT DOCUMENTS

| | | | |
|---|---|---|---|
| 2193419 | 2/1988 | United Kingdom | 379/374 |
| 9112685 | 8/1991 | WIPO | 379/374 |

*Primary Examiner*—Fan Tsang

[57] ABSTRACT

A personalized annunciating signaling telephone unit delivers a first outgoing message to a caller identifying a plurality of codes which may be entered by the caller in order to identify the particular party the caller wishes to talk to. Once the caller enters one of the codes, a particular ring signal is generated at the other end of the caller to indicate the person associated with particular code whom the caller wishes to talk to. The user of the unit may record each particular ring signal activated by the various codes input by a caller. In this way, each particular ring signal may be a customized prerecorded verbal message, a particular tone, or any particular prerecorded sound which is reproduced by a speaker of the unit upon receiving the particular code from the caller. Once the ring signal is generated, a timer is activated to activate the second outgoing message at the termination thereof indicating that the caller may leave a message which is recorded by the unit.

1 Claim, 4 Drawing Sheets

PERSONALIZED ANNUNCIATION SIGNALING PHONE UNIT

BACKGROUND OF THE INVENTION

1. Field of the Invention

The present invention relates to a personalized ring phone which allows people to customize the phone to ring in various distinctive ways such that they will be able to recognize the various customized phone rings and be able to determine who the caller wished to speak to. Another option which may be offered instead of a phone is a unit that attaches to regular phones and would have a customized ring function. Additionally, individualized answering machines can be incorporated into the phone whereby, when a certain person leaves, that individual can set the phone to record messages from callers who had specifically called to talk to that certain person.

2. Description of the Prior Art

The present invention relates to a personalized ring phone which allows various people to customize the phone to ring in various ways according to which person is being called such that each person will recognize the customized phone ring and be able to immediately determine who the caller wishes to speak to. Ultimately, when a caller calls a subscriber who has the personalized ring phone, immediately they will get a prerecorded message which informs them as to what number to press in order to get a particular individual. The caller will then, using a touchtone telephone, press the appropriate number in order to talk to the persons which they wish to speak to. Once the number is pressed, the phone will then ring the customized ring and the people being called will immediately know who the call is for. In cases in which the person calling is not using a touchtone telephone, the caller then can wait until the message is over in order to get a standard ring. Also, if the caller already knows the number to press in order to reach the person they wish to speak to, the button can be pressed immediately after the call is put through, thus allowing for quicker access. In some models, individualized answering machines may be incorporated into the phone whereby, when a certain person leaves the premises, the individual leaving can set the phone to record messages from callers who had specifically called to talk to that particular individual. Another option which may be offered is a unit that attaches to regular telephones where the unit has the customized ring function. This would allow for any standard phone to ring a customized ring instead of a regular common ring. In this present invention, the sound of the ring is capable of being customized via being recorded on a dynamic random access memory chip with any sound that the user wishes to input via a built in microphone. After the incoming caller selects the party they wish to talk to, the phone will ring with that particular person's ring. If there is no answer, the call will go to the selected person's answering machine such that the number of rings before the answering machine picks up is programmable.

U.S. Pat. No. 3,506,791, issued Apr. 14, 1970 to J. Halaby discloses a Telephone System For Directing Calls To Persons Instead Of Stations in which an incoming call received by a central station causes the wireless transmission of a signal identifying the person being called. The person identified wears a transceiver which alerts the person to the fact that he/she is being called. That person then goes to any of a number of special telephones which are actuated by the person's transceiver to control a selector to connect the incoming call to the telephone thusly approached. The incoming telephone call actuates the transceiver to alert the person receiving the call of the incoming call, rather than actuating the telephone to ring with a distinctive ring for each of a number of persons receiving calls.

U.S. Pat. No. 3,936,617, issued Feb. 3, 1976 to Duane Ridgely Bolgiano discloses a Code-Controlled Ringer Attachment For Telephones which selectively deactivates a telephone bell on a telephone instrument such that when a telephone number is called, an auxiliary system automatically cuts in to prevent ringing of the bell until a predetermined code is initiated by the calling station, at which time the telephone bell is actuated. This particular invention is used to screen calls by rejecting any calls which are received for which the caller does not input a predetermined code to allow the call to be received by the receiving telephone.

U.S. Pat. No. 3,943,289, issued Mar. 9, 1976 to Norman A. Sheldon et al. discloses an Automatic Telephone Caller where a prerecorded message is supplied to a plurality of telephone subscriber numbers automatically called in sequence from a local station.

U.S. Pat. No. 4,006,316, issued Feb. 1, 1977 to Duane Ridgely Bolgiano discloses a Code-Controlled Detection And Function Actuating System which screens out undesired signals from desired signals via selective programming of the system through programmed codes. This system also has means to utilize the desired signals to effect the performance of a selected function such as the sounding of a signalling means to indicate the transmission of the desired signals, the activation or deactivation of electrically controlled devices, or the actuation of a reprogramming means, the system being especially adapted to utilization in a telephone system for screening out undesirable calls and permitting desirable calls to effect activation of the selected functions. This system may be used simultaneously with all phone instruments on a given line and provides a system that can be programmed either manually or by remote control through the ordinary dial or touch-call apparatus. The system will also effect complete silence or actuate any other type of signal, such as a busy signal or the like, when the correct code is not dialed or touch-called, so that there is no indication whether there is anyone at the number being called or not, thus providing protection against possible burglaries. This system can also be programmed for a plurality of different codes so that if a certain code refers to a certain party, it can be determined that such party has called if the phone is not answered, This system may also be utilized to remotely control the functions or monitor the functions of various electrically-operated devices such as lamps, heaters, air-conditioners, ovens and the like.

U.S. Pat. No. 4,850,013, issued Jul. 18, 1989 to H. Barry Rose discloses a Telephone Call Screening Apparatus to be connected in combination with a conventional telephone receiver and its circuit which prevents the telephone receiver from being activated until a preselected code is supplied into the telephone circuit by the calling party.

U.S. Pat. No. 4,866,766, issued Sep. 12, 1989 to James E. Mitzlaff discloses a Telephone Device Having Customized Ring Capability incorporates a telephone set with a conventional keypad to allow the user to program a custom ring tone and patterns into the telephone set. After such programming is established, when the telephone set detects a ring signal from the central switching station, a ringer is activated and deactivated according to the programmed ringing parameters so as to provide a truly customized ring signal to the user.

U.S. Pat. No. 4,982,420, issued Jan. 1, 1991 to Peter F. Theis discloses a Recording System With Response Categorization which presents a user with a sequence of prompt messages and stores user responses to at least selected ones of these prompt messages, classifies the stored user responses in a first category when the user responds to a first one of the prompt messages and not to a second one of the prompt messages, and classifies the stored user responses in a second category when the user responds to both the first and second prompt messages. In addition, this system classifies the stored user responses in a third category when the response includes any one of a plurality of code words, and in a fourth category when the user response includes none of these code words. An alternate embodiment classifies stored user responses in accordance with the duration of the response to a selected prompt message. A first feature of this invention relates to a system which presents a user with a sequence of prompt messages and acts upon the responses to selected prompt messages to classify the user responses in a first category when the user responds to one of the prompt messages and not to the other, and a second category when the user responds to both of the prompt messages. Alternatively, the stored user responses can be classified based on the length of the user response to a selected prompt message. This feature of the invention can be used to store user responses from completed calls in a first storage sector and to store user responses from uncompleted calls, in which the user did not respond to all of the prompt messages, in a second storage sector. An operator can then retrieve the user responses in the first category from the first storage sector first for transcription and action. The uncompleted calls of the second category can be handled with lower priority. Similarly, calls with excessively long or excessively short responses to a particular prompt message can be categorized for high priority retrieval. According to a second feature of this invention, a system of the type that presents a user with at least one prompt message and records at least a portion of the user voice response is provided with at least first and second expression recognition means for generating first and second signals when a user voice response includes first and second expressions, respectively. The user response is classified in a first category when either one of the first and second signals is generated, and the user response is classified in a second category when neither of the first and second signals is generated. This second feature of the invention utilizes a probabilistic approach to categorize the user voice response. If the user response includes any one of a plurality of selected expressions or words, the response is classified in a first category. For example, if it is desired to segregate user responses relating to sales orders from user responses relating to other topics, the word recognition means should be adapted to detect words characteristically used in placing a sales order. If the user uses any one of these words, it is likely that the topic of the call is a sales order.

U.S. Pat. No. 4,998,272, issued Mar. 5, 1991 to James R. Hawkins, Jr. et al. discloses a Personal Voice Mail System adapted to be connected to a standard touch tone telephone. This system allows a subscriber to prerecord a message to be delivered to one or more called parties at a particular time. Additionally, the system can be made secure by requiring the called party to provide a confidential code before the message is relayed.

U.S. Pat No. 5,031,205, issued Jul. 9, 1991 to Stephen Phillips discloses an Auto Response Phone System that allows a user to automatically screen calls and respond without even talking into a telephone receiver. In one embodiment of the invention the system is built into a conventional telephone. In an alternative embodiment the system is built into a separate case and operates as an accessory. The system stores several messages in non-volatile electronic format. The user picks up the phone when called to identify the caller. The user can then speak to the caller or automatically send one of the pre-recorded messages. A special night button automatically gives a night time message and disables the telephone ringer. If the caller sends a predetermined sequence of touch tones the user's ringer is reactivated to permit emergency calls to be answered. A monitor capability allows the user to monitor all telephone transactions.

U.S. Pat. No. 5,172,404, issued Dec. 15, 1992 to Kazuo Hashimoto discloses a System For Coupling Telephone Answering Device And Voice Mail Apparatus Together. In this invention, a system combines a telephone answering device installed at each subscriber's premises and a voice mail center station. When integrated chip memory is used as recording media of the telephone answering device to record messages from a calling party, the memory becomes full to its capacity shortly, and the telephone answering device cannot fulfill its function. To prevent this, a voice mail side is set to a message-receiving mode and an incoming message is transferred from the telephone answering device side to the voice mail side by calling the voice mail side and receiving a particular signal from the telephone answering device side. Then, the telephone answering device restores its function and becomes capable of recording new incoming messages. It was a common usage of the voice mail center that a calling party directly record incoming messages in the voice mail center. In this system, however, an incoming message stored in the voice mail center can be transferred to the telephone answering device by controlling from the telephone answering device as occasion demands, and the incoming message can be stored in the telephone answering device. This system makes possible a new combination wherein a telephone answering device and a voice mail center, previously independent apparati, can control each other.

None of the above inventions and patents, taken either singly or in combination, is seen to describe the instant invention as claimed.

SUMMARY OF THE INVENTION

A personalized annunciation signalling phone unit of the present invention allows a user to program into the device a plurality of personalized audio messages to be used as ring signals so as to indicate that a certain person identified with a particular personalized audio message is sought by the caller. In this manner, the user knows who is sought by the caller before answering the phone. A dual tone multi-frequency (DTMF) decoder is used by the phone unit to detect touchtone signals sent by the caller. A predetermined touchtone signal is associated with the identity of a user sought by the caller. Once the phone unit determines which DTMF signal is sent by the caller, the phone unit begins to broadcast the personalized audio message associated with the identity of the user sought by the caller as identified by the received DTMF signal.

Should the user sought by the caller be unable to answer the phone, the phone unit may record a message from the caller. The personalized audio message associated with the sought caller is broadcast via a built in speaker of the phone unit to everyone in the vicinity of the phone unit for a predetermined period of time after the DTMF signal is received from the caller. Immediately following the reception of the incoming call, the caller is provided with a first outgoing message identifying each personalized DTMF code to identify a particular individual. For example, the first outgoing message may be "Hi, you have reached the Jameson residents, if you wish to speak to Jake press 1, Thomas press 2, Jane press 3, or Thelma press 4." Should the caller fail to provide a personalized DTMF code to identify the called party sought, a standard ring signal or message is broadcast. Further, if the DTMF code is not a listed code, such as a "5" in the example above, the standard ring signal is also generated.

Accordingly, it is a principal object of the invention to provide a caller with a set of options to identify a particular called party.

It is another object of the invention to provide a particular annunciation announcement in the vicinity of the phone unit which corresponds to the identity of the particular party sought by the caller.

It is a further object of the invention to provide a standard ring signal in the event that the caller fails to provide an appropriate DTMF code identifying a particular party.

Still another object of the invention is to record a caller's message in the event the phone is not answered.

It is an object of the invention to provide improved elements and arrangements thereof in an apparatus for the purposes described which is inexpensive, dependable and fully effective in accomplishing its intended purposes.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
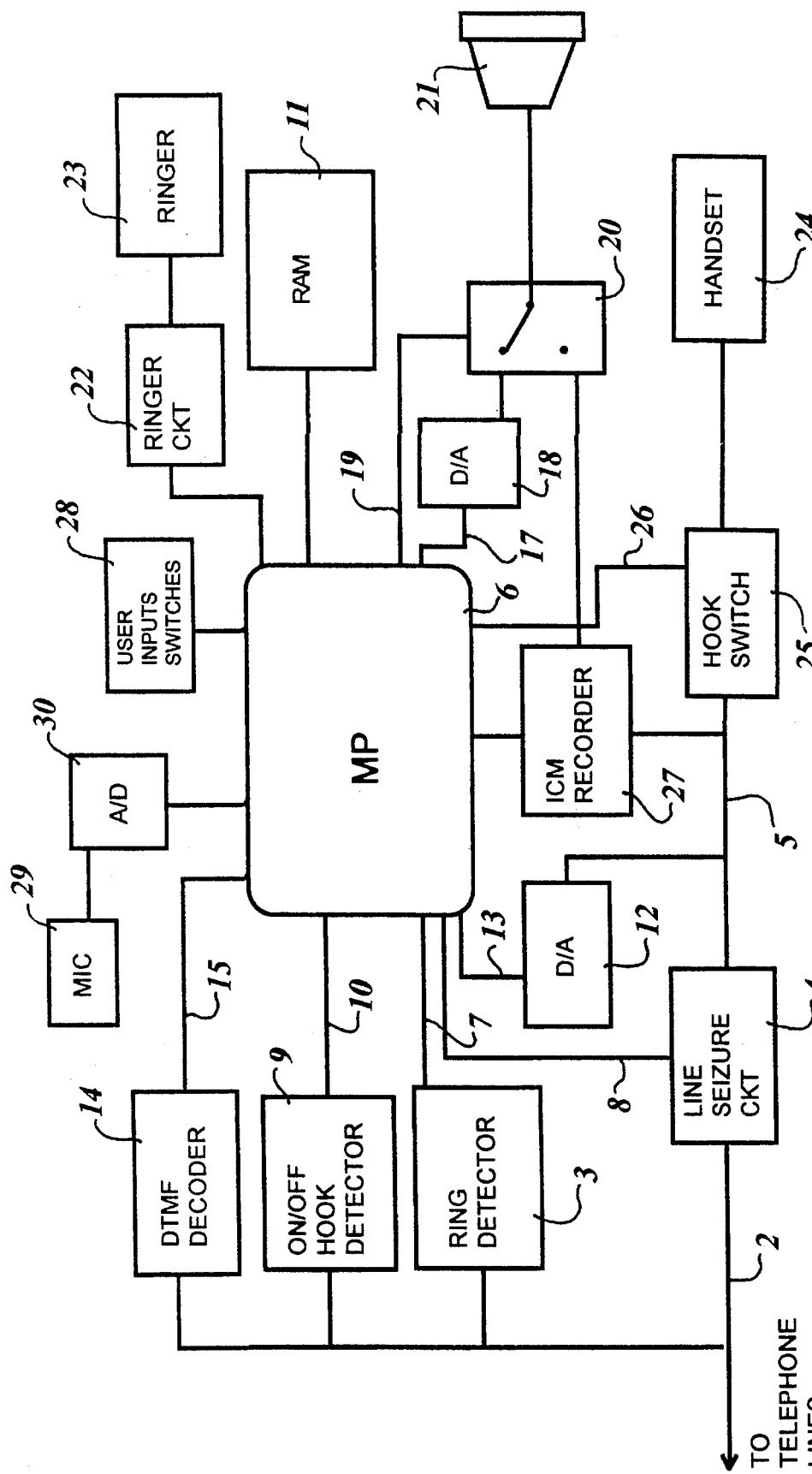
FIG. 1 is a block diagram of the personalized ring telephone in accordance with a first embodiment of the present invention.

A personalized annunciating phone unit 1 of the present invention, as illustrated in FIG. 1, includes a telephone line connection 2 for connecting to telephone lines from a central office. Ring detector circuit 3 is used to detect the presence of an incoming call across the telephone line connection 2. The ring signal detector 3 is designed to detect the standard ring signal produced by the central office to indicate the presence of an incoming call. A line seizure circuit 4 is connected to the telephone line connection 2 so as to provide a line seizure indication to the central office. Upon seizing the line, the line seizure circuit 4 also connects a seized line connection 5 to the telephone line connection 2.

Figure 2A:
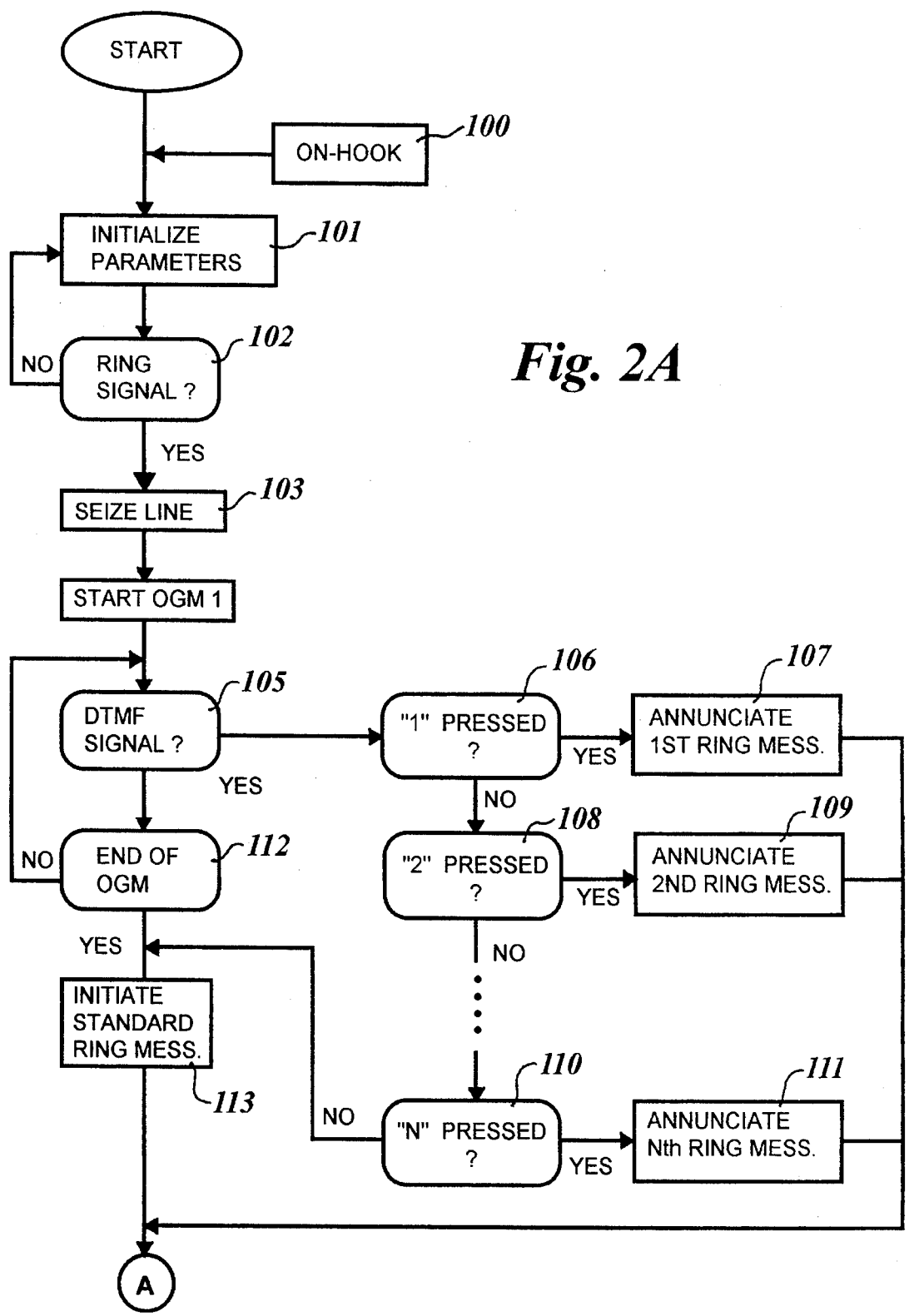
FIG. 2A is a flowchart of the first half of the main operating program for the personalized ring telephone of the present invention.

A microprocessor controller 6 is used to receive an output of the ring detector 3 via port connection 7. The controller 6 includes a port connection 8 for controlling the line seizure circuit 4 to seize or release the telephone line. The microprocessor controller 6 includes software to perform its controller function. The main operating program algorithm is illustrated in FIG. 2A. After initializing various parameters as will be described below, the controller 6 monitors for an incoming ring signal (steps 101 and 102) and seizes the telephone in the event of an incoming call (step 103). On/off hook detector 9 is connected across the telephone line connection 2 so as to produce an on-hook indication to the microprocessor controller 6 via a port connection 10 should the caller hang-up. In this manner, should the caller hang up during any operation of the telephone unit 1, on/off hook detector 9 provides an on-hook indication to port connection 10, and the controller 6 causes the line seizure circuit 4 to release the telephone line and discontinue its main operating program.

As stated above, the main operating program causes the phone unit 1 to continue monitoring the port connection 7 until the ring detector 3 indicates the presence of an incoming call. Once an incoming call is detected and after the telephone line has been seized, an initial outgoing message is sent to the caller (step 104). Solid state random access memory (RAM) 11 is used to store the initial outgoing message in a portion thereof. After issuing a command to seize the telephone line, the microprocessor 6 reproduces the initial outgoing message (OGM 1) by reading the portion of the RAM 11 on which the initial outgoing message is stored and transferring the digitally stored initial outgoing message to digital to analog converter (A/D) 12 via port connection 13 (see step 103). The converter 12 is connected to the seized telephone line connection 5 so as convert the digitally stored data provided by port connection 13 to an analog signal. In this manner, the initial outgoing message is reproduced onto the telephone line. The initial outgoing message indicates to the caller options for identifying the identity of the person sought by the caller. The caller identifies the identity of the person sought by pressing one of the pushbuttons on a touchtone phone.

After the caller has pressed one of the pushbuttons on a touchtone phone, dual tone multi-frequency (DTMF) decoder 14 is used to detect which pushbutton the caller pressed. The DTMF signal provided by the caller is translated into a personalized identification command signal by the decoder 14. The personalized identification command signal is sent across port connection 15 to the microprocessor 6 allowing the microprocessor to determine which personalized audio message to reproduce in accordance with the particular personalized identification command code received (see steps 105–111).

A plurality of personalized audio messages are stored within portions of the RAM 11. Each personalized audio message provides an indication of a distinct identity of a person sought by the caller. As shown in FIG. 2A, if the caller pressed a "1", the first personalized ring message is reproduced (steps 106 and 107); however, if the caller pressed a "2", the second personalized ring message would be reproduced (steps 108 and 109). There are a possibility of "n" different codes which may be provided to distinguish the identity of various residents of a household (steps 110 and 111).

Once the proper personalized identification audio message has been accessed by the microprocessor controller 6, that message is transferred to a port connection 17 and is converted to an analog audio electrical signal by a digital to analog converter 18. The microprocessor controller 6 also provides a switching indication across port connection 19 so as to control a switch 20 to pass the personalized identification audio message converted into an analog signal to a speaker 21. In this manner, the speaker 21 is used to broadcast to those in the vicinity of the telephone unit 1 the identity of the individual sought by the caller.

Figure 2B:
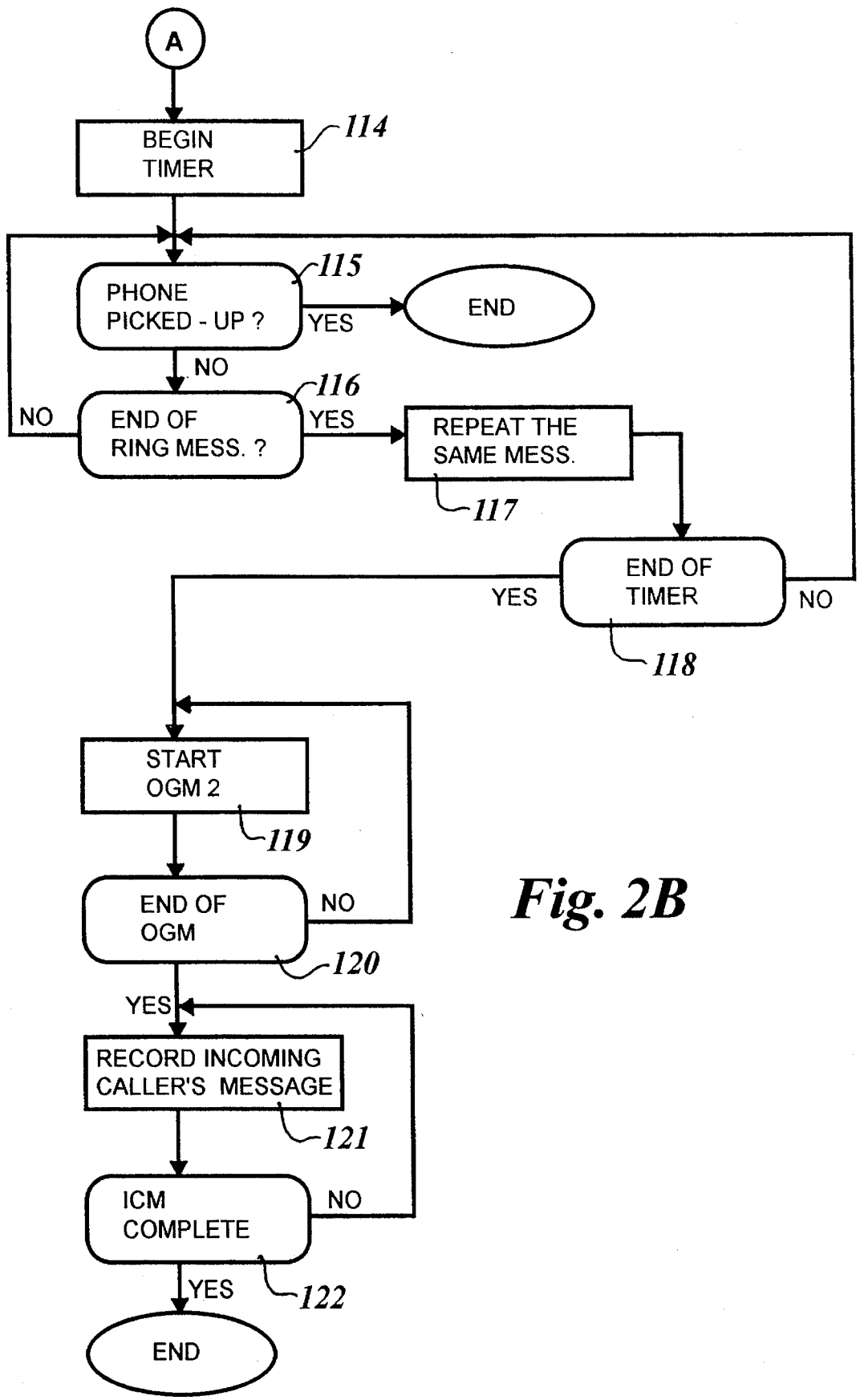
FIG. 2B is a flowchart of the second half of the main operating program for the personalized ring telephone of the present invention.

After the initial outgoing message is completed, should the caller not respond at all, or respond with an unidentifiable personal identification code, a standard ring message from RAM 11 is reproduced. Alternatively, optional circuitry including a ringer circuit 22 and ringer 23 is provided as a conventional ringing signal and may be used in lieu of the standard ring message broadcast over the speaker 21. After a ring message is reproduced, a timer is started (step 114 of FIG. 2B). The timer is a software timer routine within the software of the microprocessor controller 6. Microprocessor 6 then monitors to determine whether or not the person sought by the caller has picked up the phone (step 115).

The telephone unit 1 includes a handset 22 having a hook switch 23 associated therewith. If the handset 24 is lifted to answer the phone, the hook switch 23 closes to connect the handset 24 to the seized telephone line connection 5 as well as provides an indication that the telephone is off-hook via port connection 26. Once the handset 24 is hung-up, the hook switch 25 is opened again to release the handset 24 from the seized telephone line connection 5 as well as to provide an indication to the microprocessor that the handset is hung-up.

Should the handset 24 be picked up, as determined in step 115, the main operating program is terminated. The port connection 26 is a vectored input port connection as is well-known in the microprocessor art, and will terminate the main operating program no matter what step of the main operating program is being performed. The microprocessor also maintains the line seizure circuit. 4 closed so as to connect the handset to the telephone line as long as the handset 24 is lifted and the hook switch 25 is closed. Port connection 10 is also a vectored input port to microprocessor 6, and will terminate the main operating program no matter what step is being performed thereby if the caller hangs up. Once the main operating program is terminated. If the telephone unit 1 is still in its telephone answering mode as will be described below, the main operating program branches to the start and reinitializes the parameters used by the microprocessor before monitoring for another incoming call (see steps 100 and 101 of FIG. 2A).

If it is determined that the handset 24 has not been picked up as determined in step 115, and if the end of the ring message has been reached as determined in step 116, the ring message is repeated in step 117. In the event of the optional standard ring signal being used instead of a standard ring message broadcast over the speaker 21, the ringer 23 is simply maintained active in step 117 via the port connection to the ringer circuit 22.

After step 117, the main operating program determines whether or not the software timer, operating concurrently therewith, has timed out (see step 118). If the timer has timed out as determined in step 118, the main operating program branches to step 119 and commences the second outgoing message informing a caller that the called part sought thereby is not available to pick up the phone. The caller is also informed by the second outgoing message that a message may be left for the called party. Such a message would be recorded on the incoming message (ICM) recorder 27 under the control of the microprocessor via the port connection thereto. The ICM recorder 27 is connected to the seized telephone line connection 5 to receive the caller's message. After the second outgoing message has been finished as determined in step 120, the caller may leave a message. Once the ICM of the caller is recorded in step 121 as determined in step 122, the main operating program is terminated.

The microprocessor controller 6 includes user input subroutine software for allowing the user control over various aspects of the operation of the telephone unit 1. The subroutines are initiated in response to various user inputs received by user input control switches 28. For example, the user may wish to record the outgoing message on the RAM 11. This is accomplished by initiating the appropriate user input and then speaking into a built in microphone 29 which is connected to analog to digital converter 30 to convert the OGM into a digital form before the microprocessor stores the OGM in the appropriate portion therein. In a like manner, the user may store each personalized audio message within the RAM 11, each one store in a separate location of the RAM 11 so as to be selectively retrieved by the microprocessor controller 6.

The user may also wish to retrieve the ICM's recorded on recorder 27. Again, the user initiates the proper input controls using user inputs 28 to begin listening to the ICM's. The microprocessor controller 6 changes the switch 20 to connect the speaker 21 to the output of the ICM recorder 27. The microprocessor controller 6 then causes the recorder 27 to begin play the ICM's. Other standard telephone answering functions such as stop, toll saver, varying the number of rings before going off-hook, speaker phone options, memo recording, etc., may also be controlled by the user via user inputs 28.

Figure 3:
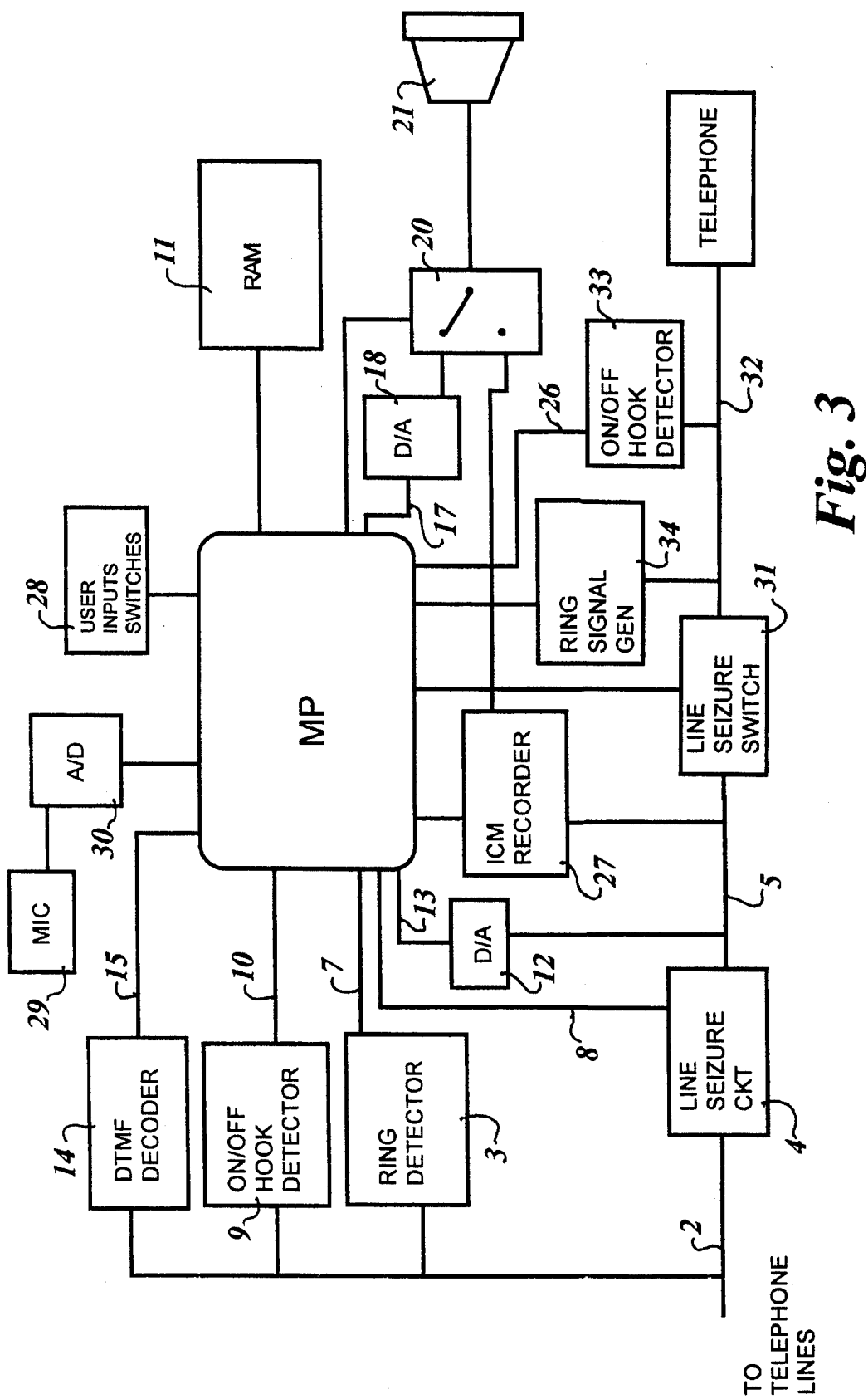
FIG. 3 is a block diagram of the personalized ring telephone in accordance with a second embodiment of the present invention.

In an alternate embodiment, as illustrated in FIG. 3, the telephone unit 2 is identical to the telephone unit 1, except that it is attached to an existing phone instead of including its own handset. Instead of a hook switch 26, the telephone unit 2 includes a line seizure switch 31 which is controlled by the microprocessor 6 to connect to or disconnect the phone from the seized telephone line connection 5. The line seizure switch 31 is connected to the phone via a phone connection 32. Also connected to the phone connection 32 is on/off hook detector 33 which detects when the phone goes off-hook or on-hook. Should the on/off hook detector 33 detect that the phone has gone off-hook as a user picks up the handset thereof, the detector 33 sends a control signal to port 26 of microprocessor 6 so as to halt the operation of the main operating program and to close the line seizure circuit 4 as well as the line seizure switch 31, thereby connecting the phone to the telephone line via telephone line connection 2.

Further, the telephone unit 2 does not include the optional ringer circuit 22 and ringer 23 since the phone includes its own ringer circuitry and ringer. Should the standard ring message be initiated in step 113 as discussed above, the ring signal generator 34 should be activated to produce a standard ring signal across the phone connection 32 to cause the phone to ring.

It is to be understood that the present invention is not limited to the sole embodiments described above, but encompasses any and all embodiments within the scope of the following claims.

I claim:

1. A personalized ring telephone unit, including:
   a telephone line connection for receiving a telephone line from a central office;
   a ring detector for detecting an incoming call across said telephone line connection and providing an incoming call indication signal at an output thereof upon detecting the incoming call;

line seizure circuitry for seizing said telephone line upon recieving an off-hook command signal at an input thereof;

first outgoing message delivery means for delivering a first outgoing message across said seized telephone line;

first controller means for producing said off-hook command signal at the input of said line seizure circuitry in response to said incoming call indication signal produced at the output of said ring detector and for activating said first outgoing message delivery means after producing said off-hook command signal;

a code detector for receiving a predetermined code across said telephone line connection and for producing a personalized identification command signal at an output thereof in accordance with the predetermined code received thereby;

a speaker for producing an audio acoustic signal in response to an electric signal received at an input thereof;

personalized annunciating storage means for storing a plurality of personalized audio messages, whereby each personalized audio message provides an indication of the identity of the person sought by a caller; and second controller means responsive to said personalized identification command signal produced at said output of said code detector for controlling said personalized annunciating storage means to provide a corresponding one of said personalized audio messages to said input of said speaker, wherein said one of said personalized audio messages identified the person sought by a caller;

an incoming message recording unit having a first input means connected across said seized telephone line and a second input means for receiving an incoming message record command signal, said incoming message recording unit operating to start recording signals received by said first input means thereof upon receiving said incoming message record command signal at said second input means thereof;

first message completion detection means for detecting the end of said first outgoing message; and third controller means for generating said incoming message record command signal upon the detection of the end of first outgoing message by said first message completion detection means;

a microphone for recieving an audio acoustic signal from a user and producing an electrical signal at output thereof;

user input means for allowing a user control over the operation of said personalized ring telephone unit, said user input means including a plurality of personalized annunciater record switches, each personalized record switch being associated with an identity of a person sought by a caller, said user input means further including an outgoing message record switch, and an incoming message playback switch;

fourth controller means responsive to the actuation of one of said personalized annunciator record switches for recording said electrical signal produced by said microphone as one of said plurality of personalized audio messages on said personalized annunciating storage means, said one of said plurality of personalized audio messages associated with said one of said personalized annunciator record switches providing an indication of the identity of the person sought by a caller; and fifth controller means responsive to the actuation of said outgoing message record switch for recording an electrical signal produced by said microphone as said first outgoing message on outgoing message storage means.

* * * * *